(12) United States Patent
Chang et al.

(10) Patent No.: US 9,251,222 B2
(45) Date of Patent: Feb. 2, 2016

(54) ABSTRACTED DYNAMIC REPORT DEFINITION GENERATION FOR USE WITHIN INFORMATION TECHNOLOGY INFRASTRUCTURE

(75) Inventors: Kyusun Chang, Austin, TX (US); Ryan Kelly Wilhm, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 3079 days.

(21) Appl. No.: 11/427,378

(22) Filed: Jun. 29, 2006

(65) Prior Publication Data

US 2008/0016086 A1    Jan. 17, 2008

(51) Int. Cl.
*G06F 17/30*    (2006.01)

(52) U.S. Cl.
CPC .... *G06F 17/30554* (2013.01); *G06F 17/30008* (2013.01); *G06F 17/30286* (2013.01)

(58) Field of Classification Search
CPC .................. G06F 17/30008; G06F 17/30286; G06F 17/30554
USPC ................. 707/603, 609, 100, 204, 802, 640; 705/5
See application file for complete search history.

(56) References Cited

U.S. PATENT DOCUMENTS

| | | | |
|---|---|---|---|
| 4,872,054 A | 10/1989 | Gray et al. |
| 5,455,627 A | 10/1995 | Eitzmann et al. |
| 5,765,005 A | 6/1998 | Maruoka et al. |
| 6,216,139 B1 | 4/2001 | Listou |
| 6,336,124 B1 | 1/2002 | Alam et al. |
| 6,670,972 B2 | 12/2003 | Grieve et al. |
| 6,853,354 B2 | 2/2005 | Asamura |
| 8,712,965 B2 | 4/2014 | Chang et al. |
| 2003/0074358 A1 | 4/2003 | Sarbaz et al. |
| 2005/0159996 A1 | 7/2005 | Lazarus et al. |

(Continued)

FOREIGN PATENT DOCUMENTS

JP    2004246897    2/2004

OTHER PUBLICATIONS

Sundberg et al., "Metadata Driven Report Parameter Screens", IBM Technical Disclosure Bulletin, Aug. 2001, No. 448, article 171, p. 1430.

(Continued)

*Primary Examiner* — Shahid Alam
(74) *Attorney, Agent, or Firm* — Yee & Associates, P.C.; Joseph Petrokaitis

(57) ABSTRACT

A computer implemented method, data processing system, and computer program product for abstracted dynamic report definition generation within an information technology infrastructure. When a request to generate a report is received, report definition associated with the requested report is identified, wherein the report definition comprises a generalized description of desired data in the report without any database-specific properties. The resources which are able to provide the desired data using report instance parameters in the report definition are then identified. Responsive to determining the resources that are able to provide the desired data, the generalized description in the report definition is translated into report content generation engine-specific implementation details and actions. The translated report content generation engine-specific implementation details and actions are executed to obtain the desired data from the resources. A report may then be generated based on the resulting output.

20 Claims, 7 Drawing Sheets

(56) References Cited

U.S. PATENT DOCUMENTS

2007/0179959 A1    8/2007    Sharma et al.
2008/0005197 A1    1/2008    Chang et al.
2009/0182588 A1*   7/2009    Ashby et al. .................... 705/5

OTHER PUBLICATIONS

Antoni Olive, Ruth Raventos, "Modeling events as entities in object-oriented conceptual modeling languages", ScienceDirect, Data & Knowledge Engineering, vol. 58, Issue 3, Sep. 2006, pp. 243-262.
synonym.com, "request" implies "ask".
synonym.com, "acceptable" implies "standard".
synonym.com, "unacceptable" implies "nonstandard".
Office Action, dated May 1, 2008, regarding U.S. Appl. No. 11/427,385, 20 pages.
Final Office Action, dated Sep. 19, 2008, regarding U.S. Appl. No. 11/427,385, 40 pages.
Notice of Allowance, dated Dec. 4, 2013, regarding U.S. Appl. No. 11/427,385, 11 pages.

* cited by examiner

FIG. 3B

```xml
<reportDefinition name="Inventory_Installed_Software">
    <descriptor>
    <title>Installed Software</title>
    <subtitle>on Computing Systems</subtitle>
    <description>This report displays installed software for each host.
</description>
    <category>Out-Of-Box</category>
      <header>Grouped by Hostname</header>
    <footer>Installed Software on Computing Systems grouped
by Hostname</footer>
     <traitList>
    <trait name="canned">true</trait>   </traitList>
    </descriptor>
    <dataSets>
      <dataSet name="SOFTWARE_INSTALL_VIEW_DATASET">
      <entity name="SOFTWARE_INSTALL_VIEW" source="CMDB">
    <attribute>Hostname</attribute>
    <attribute>Architecture</attribute>
     <attribute>Memory</attribute>
     <attribute>OS Name</attribute>
    <attribute>OS Version</attribute>
    <attribute>Product Name</attribute>
     <attribute>Product Version</attribute>   </entity>
    </dataSet> </dataSets>
    <parameterDescriptorList/>
    <aggregationOperations>
    <aggregationOperation name="Step1" type="query">
    <dataSets>  <dataSet refName=
"SOFTWARE_INSTALL_VIEW_DATASET"/> </dataSets>   </aggregationOperation>
    <aggregationOperation name="Step2" type="sort">
    <dataSets>  <dataSet refName=
"SOFTWARE_INSTALL_VIEW_DATASET" /> </dataSets>
    <parameterDescriptorList>
    <parameter name> ="SortMemberList" type=
"StringList">Product Name</parameter>
    <parameter name="SortOrderList" type="StringList">ASCENDING
</parameter> </parameterDescriptorList>  </aggregationOperation>
<aggregationOperation name="Step3" type="group">
    <dataSets>  <dataSet refName=
"SOFTWARE_INSTALL_VIEW_DATASET" /> </dataSets>
    <parameterDescriptorList> <parameter name="GroupMemberList" type=
"StringList">Hostname</parameter>
    </parameterDescriptorList>  </aggregationOperation> </aggregationOperations>
    <contentTypes>
    <contentType>text/html</contentType> <contentType>application/pdf
</contentType> <contentType>text/csv</contentType>
    </contentTypes>
    </reportDefinition>
```

FIG. 3C

```xml
<relationshipMap name="RelationshipMap_Name">
    <descriptor type="CMDB"/>
    <descriptor type="SQLVIEW"/>

<relationship name="PDBCHG_RPT_CU_VIEW_TABLE_ENTITY_MAP"
            type="SQLTableEntityRelationship">
        <entity name="PDBCHG_RPT_CU_VIEW"/>
        <parameter name="sqlConnectionName" value="CDBConnection"/>
        <parameter name="sqlTableName" value="PDBCHG_RPT_CU_VIEW"/>
    </relationship>

<relationship name="TASK_NAME_SQLCOLUMN_ATTRIBUTE_MAP"
            type="SQLColumnAttributeRelationship">
        <attribute name="TASK_NAME" entity name="PDBCHG_RPT_CU_VIEW"/>
        <parameter name="sqlConnectionName" value="CDBConnection"/>
        <parameter name="sqlTableName" value="PDBCHG_RPT_CU_VIEW"/>
        <parameter name="sqlColumnName" value="TASK_NAME"/>
        <parameter name="sqlColumnType" value="STRING"/>
    </relationship>

<relationship name="CI_TYPE_SQLCOLUMN_ATTRIBUTE_MAP"
            type="SQLColumnAttributeRelationship">
        <attribute name="CI_TYPE" entity name="PDBCHG_RPT_CU_VIEW"/>
        <parameter name="sqlConnectionName" value="CDBConnection"/>
        <parameter name="sqlTableName" value="PDBCHG_RPT_CU_VIEW"/>
        <parameter name="sqlColumnName" value="CI_TYPE"/>
        <parameter name="sqlColumnType" value="STRING"/>
    </relationship>

<relationship name=
            "PDBCHG_RPT_CU_VIEW,TASK_NAME_SQLCOLUMN_ATTRIBUTE_MAP"
            type="SQLAttributeEntityRelationship">
        <entity name="PDBCHG_RPT_CU_VIEW"/>
        <attribute name="TASK_NAME"/>
    </relationship>

</relationshipMap>
```

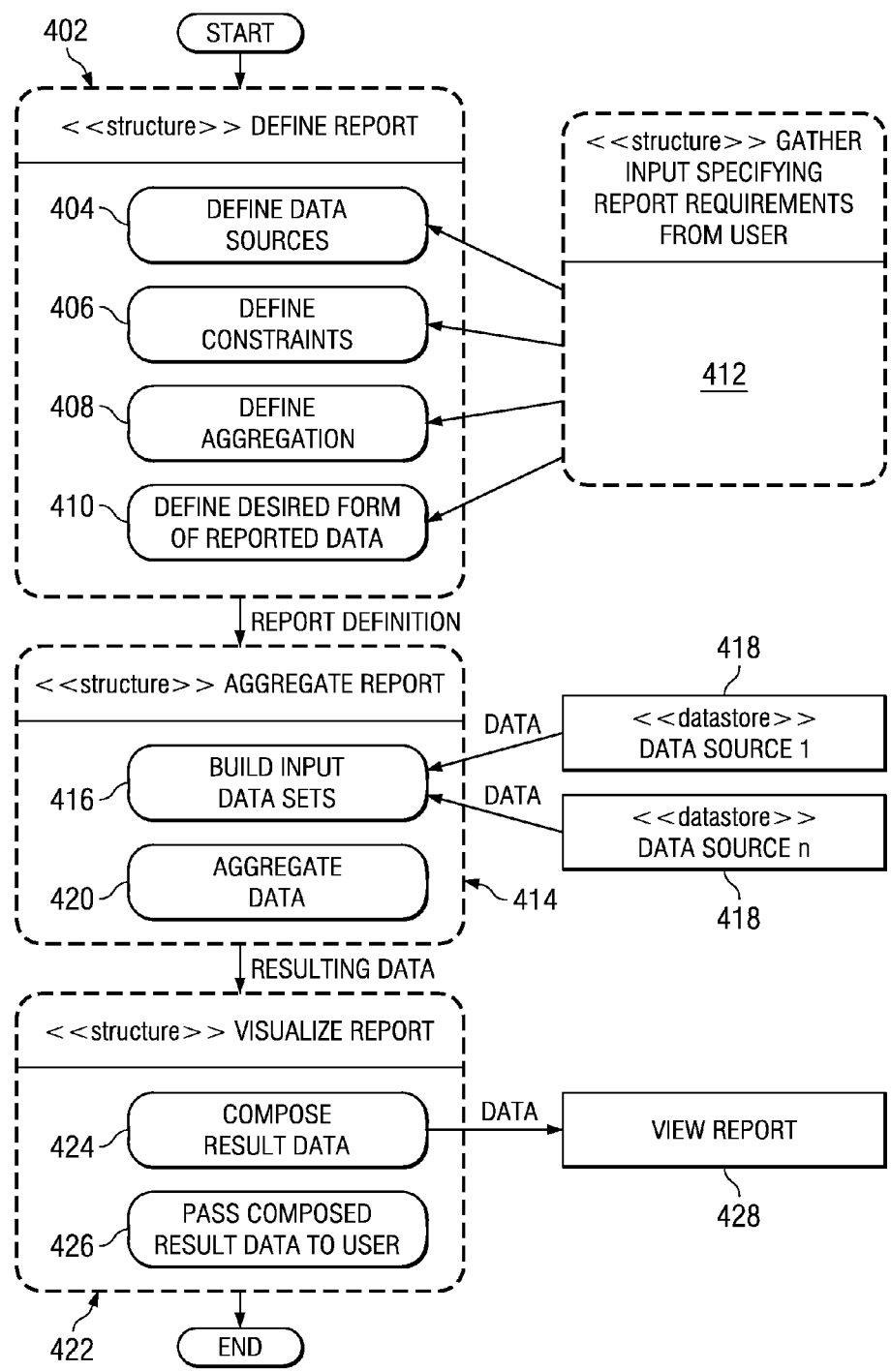

ABSTRACTED DYNAMIC REPORT DEFINITION GENERATION FOR USE WITHIN INFORMATION TECHNOLOGY INFRASTRUCTURE

BACKGROUND OF THE INVENTION

1. Field of the Invention

The present invention relates generally to an improved data processing system, and more particular, to abstracted dynamic report definition generation within an information technology infrastructure.

2. Description of the Related Art

Information stored in a database system may be retrieved through a database software application and displayed to a user. The retrieved information may be presented to the user through one or more reports in various formats, such as charts, tables, graphics, or interactive visualization tools. A report is a representation of one or more raw data sets that have been processed into some meaningful and succinct form. A report answers a simple question, usually after distilling a large amount of data. The provided answer may include any one or combination of the following: a summarization of a large set of data that can be quickly and easily understood; the correlation of two or more unique sets of data to express the current nature of a relationship; the processing of a given set of data into a normalized form (e.g., a time interval such as "requests per hour"); or the processing of a given set of data to conditionally exclude information that is not germane to the concept being expressed. Each report is generated from a report definition created by an administrator. A report definition defines the content and appearance of the report.

Reporting definitions in most existing software applications are in a proprietary format, meaning that a report definition cannot be moved between different reporting products. Report Definition Language (RDL) was developed by Microsoft®, Inc. to address this issue. RDL is an extensible markup language (XML) that defines a common schema to allow for the interchange of report definitions across reporting products. Crystal Reports is a Windows-based report generation product developed by Seagate Software that allows for creating reports from a variety of data sources with a minimum of written code. However, report definitions created using RDL and Crystal contain embedded database connection information and database schema in the report definitions. Embedding connection and database information within the report definition is problematic in terms of report definition reusability, since each time an underlying database schema changes or a database is moved, a new report definition must be created. The existing report definitions are also invalidated anytime the database changes are made, which can cause serious user-created report definition migration.

Furthermore, the mapping relationships in existing systems are also statically defined in the back-end code. The mapping relationships statically define the connections needed to retrieve data from the data sources to be used in the report. Thus, whenever there is a change to the mapping relationships (e.g., the database schema changes), the statically-defined mappings must be manually updated in the back-end code to reflect the change, and the reporting service must be rebuilt and redeployed before the changes can be utilized by any of the report definitions. In addition, having the mapping relationships statically defined in the back-end code results in a development dependency on the core reporting team when other solution developers require a new view to be exposed in order to develop report definitions.

SUMMARY OF THE INVENTION

Embodiments of the present invention provide a computer implemented method, data processing system, and computer program product for abstracted dynamic report definition generation within an information technology infrastructure. When a request to generate a report is received, report definition associated with the requested report is identified, wherein the report definition comprises a generalized description of desired data in the report without any database-specific properties. The resources which are able to provide the desired data using report instance parameters in the report definition are then identified. Responsive to determining the resources that are able to provide the desired data, the generalized description in the report definition is translated into report content generation engine-specific implementation details and actions. The translated report content generation engine-specific implementation details and actions are executed to obtain the desired data from the resources. A report may then be generated based on the resulting output.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3B is an extensible markup language file illustrating an exemplary report definition in accordance with the illustrative embodiments;

FIG. 3C is an extensible markup language file illustrating an exemplary dynamic report mapping in accordance with the illustrative embodiments;

FIG. 4 is an activity diagram of report generation in accordance with the illustrative embodiments;

DETAILED DESCRIPTION OF THE PREFERRED EMBODIMENT

Figure 1:
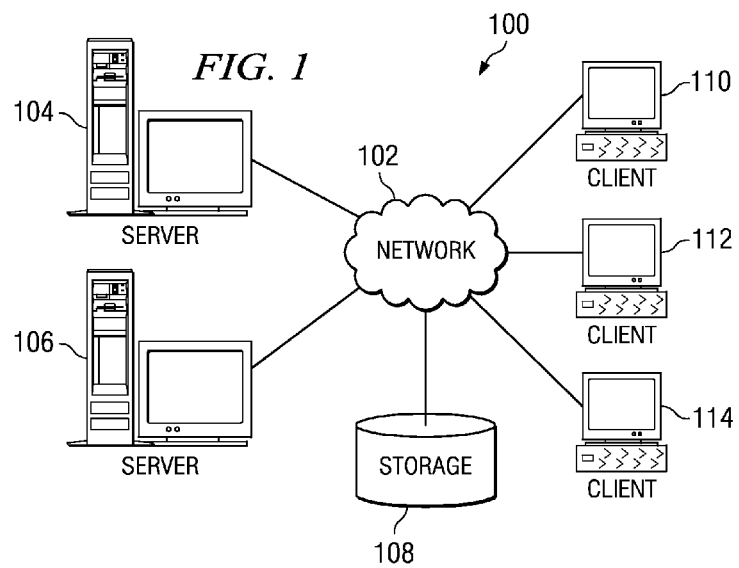
FIG. 1 depicts a pictorial representation of a distributed data processing system in which the illustrative embodiments may be implemented.
Figure 2:
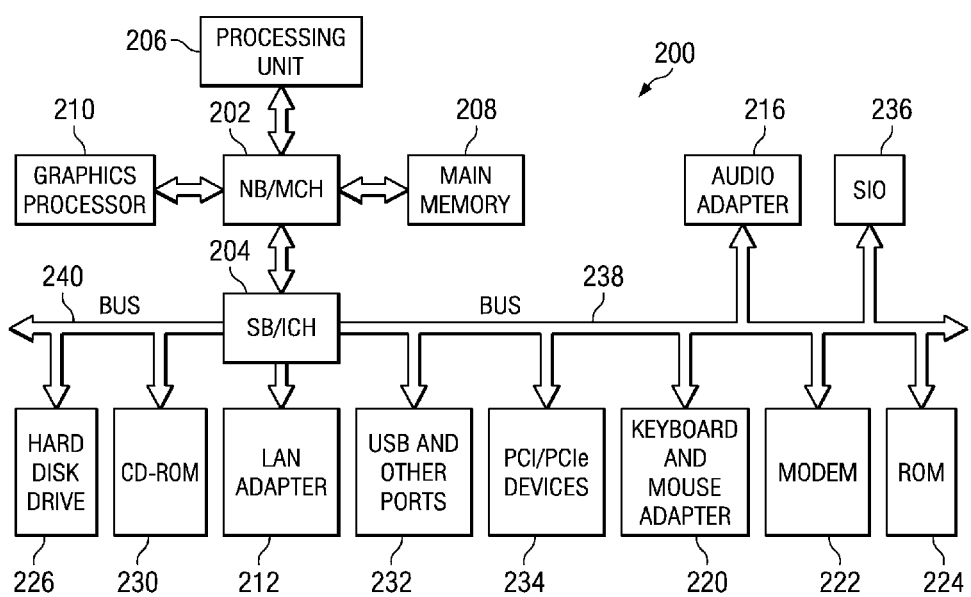
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a generic reporting service that supports the authoring and managing of reports. In particular, the generic reporting service allows for constructing report definitions which are separate from the database schema, thereby providing an abstraction of the underlying data and implementation specifics away from the report definition. In other words, the report definitions are constructed without any relationship to the physical data sources. Separating the underlying data and implementation specifics from the report definition provides several advantages. For instance, abstracting the data set details from the report definition prevents defined reports from becoming invalidated when the underlying representation of the data changes (e.g., when there is a SQL schema change). Abstracting the data connection details from the report definition prevents defined reports from becoming invalidated when a data source is moved, replaced, or otherwise modified. Abstracting the report engine details away from the report definition prevents the defined reports from becoming invalidated when the underlying report engine is changed, upgraded, replaced, or otherwise modified.

In the illustrative embodiments, a given report definition provides a generalized description of what data is desired in a report. For example, report definitions may include descriptive information about the desired data, aggregation operations, and other elements that describe the business concept to be expressed by the report definition. However, the report definitions in the illustrative embodiments provide the generalized description without using any database-specific properties in the definition. For instance, the underlying representations of a physical database, such as a SQL database or object store, are not explicitly captured in the report definition. Rather, a description of the information desired from a data source is conveyed in the definition, and the reporting service determines how best to acquire the desired data by identifying one or more data sources as satisfactory candidates to provide the data based on the generalized description.

The reporting service in the illustrative embodiments also provides a dynamic report relationship mapper which is used to dynamically provide the connections and mapping of the physical data source and the report definition at runtime. After a report definition is constructed without any relationship to the physical datasource, a report may be generated based on the report definition by first obtaining a relationship map associated with the report definition, initiating a connection to the data source and acquiring the desired data, and creating the report using the associated report definition. Through the dynamic relationship mapper, a uniform construct is provided for expressing the underlying data being reported on without requiring explicit knowledge of the semantics of accessing that data. In other words, a report developer only needs to understand what data is exposed through the reporting back-end and how to express the desired report in terms of that data using the report definition and the reporting tools provided. Details about the underlying SQL query construction (in the case of a relational database management system (RDBMS)) or the object collection aggregation (in the case of an object oriented database management system (OODBMS)) are shielded from the report developer.

The dynamic relationship mapper also abstracts the literal schema details of the database away from the report definition to provide a level of protection from changes to the schema itself, and thus mitigate the amount of work involved in updating the report definitions after such a schema change. For example, if the database schema changes and a large number of report definitions exist, there is no need to touch any of the definitions themselves. Instead, the mapping layer that translates the intermediate report definition into the underlying data query system is updated to reflect the new schema. This process reduces touching hundreds of SQL statements in each individual report definition to touching one mapping definition in the back-end. Thus, the dynamic relationship mapper removes the need to rewrite, rebuild, and redeploy code for the reporting back-end. In addition, by making dynamic mapping simple to create and manage, the need for a developer to involve the core reporting team to expose new data for use in report definitions may be eliminated.

Figure 3A:
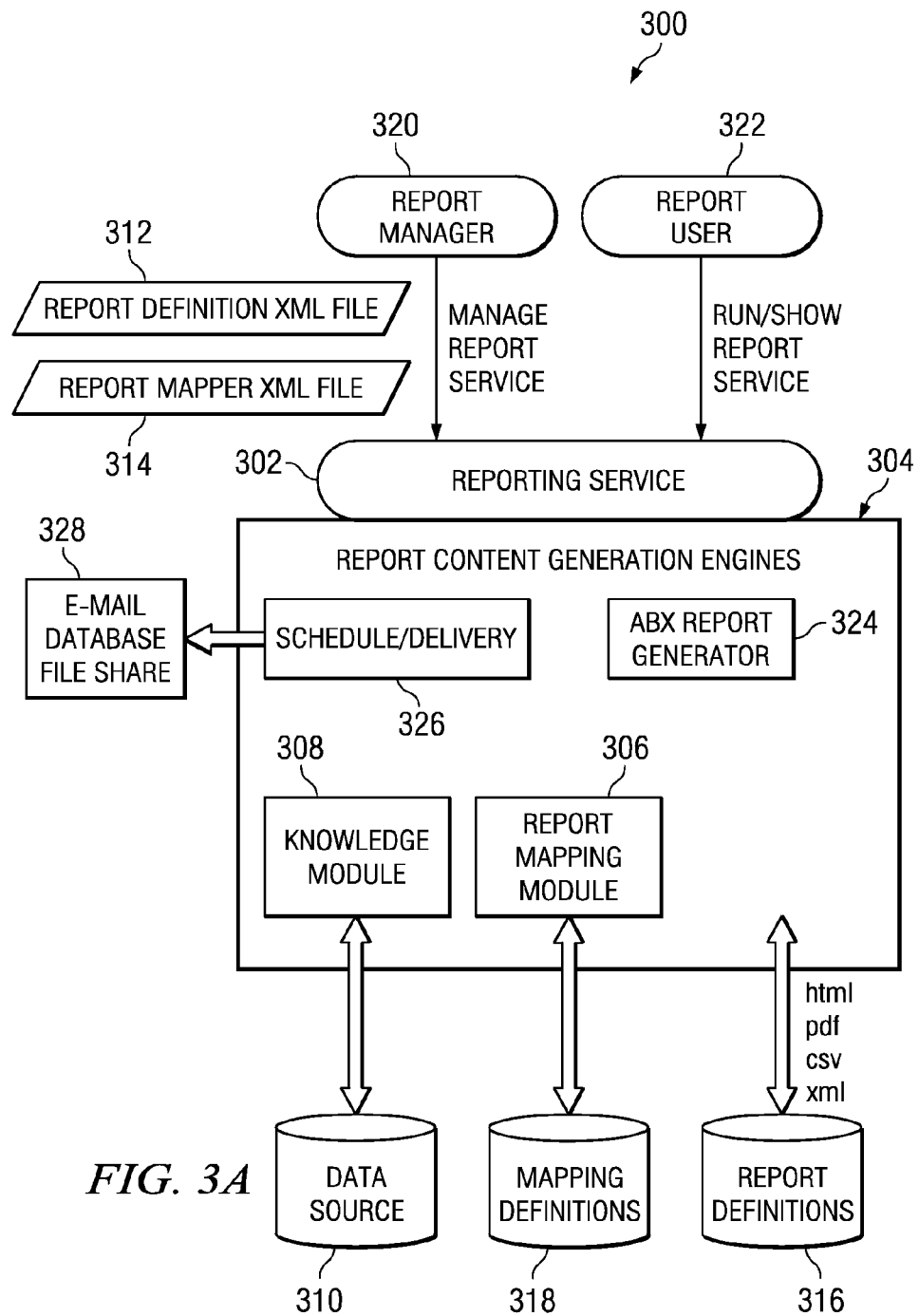
FIG. 3A is a block diagram of exemplary components that may be used for generating abstracted dynamic report definitions and dynamic mapping relationships in accordance with the illustrative embodiments.

FIG. 3A is a block diagram of exemplary components that may be used for generating abstracted dynamic report definitions and dynamic mapping relationships in accordance with the illustrative embodiments. The components shown in FIG. 3A may be implemented in a data processing system, such as data processing system 200 in FIG. 2. In this illustrative example, reporting orchestration system (ROS) 300 comprises reporting service 302, report content generation engines (RCGEs) 304, report mapping module 306, knowledge module 308, data source 310, report definition XML file 312, mapping definition XML file 314, report definitions 316, and mapping definitions 318.

Report manager 320 may be an information technology administrator who manages reporting service 302 by creating and editing report definition files 312 and mapping definition files 314 and managing the reports. Report definition XML file 312 is the externalized form of report definition 316, as it exists outside of the reporting back-end. An example of a report definition XML file is shown in FIG. 3B. Report Definition XML files may be created and edited manually using an XML text editor and an installation utility to install/modify/uninstall report definitions in the reporting service. Managing the reports may include performing off-line scheduling, determining the output format of a report (e.g., HTML, PDF, CSV, etc.), and determining the output destination of the report (e.g., electronic mail, file server, database, etc.)

The generation of a report may be initiated by a user, such as report user 322. Report user 322 submits a report request to reporting service 302. The request may include parameter and formatting instructions. Based on the content of the report request, a particular report definition associated with the report is identified and retrieved. Using the generalized information in the report definition, data sources which are best able to provide the desired data are selected, as well as the appropriate report content generation engine 304 that will be used to generate the desired report. Report mapping module 306 within report content generation engine 304 then uses mapping definition 318 to identify the mapping relationships to the selected data sources. Report content generation engine 304 retrieves the report data from the data sources. The report containing the data obtained from the data sources may then be formatted and presented to report user 322.

In this illustrative example, report definitions 316 express a report in terms of the concept the report is intended to relate. These report definitions are a generalized form of the business construct to be represented. When a report definition is installed in the reporting back-end, the report definition is transferred to the reporting service 302, read, and used to create the actual reporting back-end definition objects at runtime. A report definition is comprised of a description of the input data desired, a description of required parameterization, a description of the processing required to be applied to the input data, a description of the possible output forms, and a description of other report traits.

The description of the input data desired is a generalized description of what data is desired for the realized report. From this description, the actual data sources configured are narrowed until a satisfactory data source candidate or candidates may be found to supply the requested data. The underlying representations (for example, SQL Databases or Object Stores) are explicitly not captured in the definition. Instead, the definition describes the information conveyed by a data source, and the Reporting Orchestration System will determine how best to acquire the desired data.

As reports usually require or support parameterization to narrow the focus of a given report construct (e.g., a date range to narrow a given data set), the description of needed parameterization is used to specify possible parameters associated with the concept for a given report, as well as validation prompts. For instance, some parameters may be mutually-exclusive, and should invalidate the report instance before attempting to process it. These validation prompts may also be used as field validation from a user interface perspective.

The description of the processing required to be applied to the input data comprises the transformation of an input set of data, through aggregation or other set transformation, to an output set that illustrates a concise business concept. This description of data aggregation or transformation may include various processing methods, such as summation, grouping, sorting, and the like.

The description of the possible output forms specifies the literal content type (e.g., PDF, CSV, HTML, XML, etc. . . . ), or more broadly the type of visualization used to represent the resulting data (e.g., charts, tables, or interactive visualization tools).

The description of other report "traits" specifies the specific attributes that may not have applicability across all possible report content generation engines or content types. An example of a trait is chart colors which are not applicable to comma separated value files. Unsupported traits may still yield generated report content, and are primarily just to provide directives for special processing by engines that can support them. The traits may also be weighted to assist the Reporting Orchestration System in determining which reporting content generation engine is most suitable to generate content for a given report definition, in the event that multiple report engines are installed and supported.

Report content generation engines 304 are used to perform the actual work of report content generation. Report content generation engines 304 require implementation-specific inputs, which are similar to the information expressed in report definition 316 as described above. For example, Alphablox (ABX) report generator 324, which is a product of International Business Machines Corporation, accepts database query as input and generates the report outputs. Since ABX report generator 324 only accepts the DB SQL query, report content generation engines 304 must create the required query derived from the report definition and the relationship map. As the implementation-specific inputs are tightly coupled to the respective report content generation engines, the inputs are not generally portable across other engine implementations. Report content generation engines 304 also include scheduler/delivery 326 mechanism. Scheduler/delivery 326 mechanism allows a user to request a batch (off-line) job or schedule the creation of a report at regular intervals, such that the report will be generated per parameters given (e.g., at a certain time, daily, weekly, monthly, etc.). The generated report may be delivered to the users via electronic mail, database, or file sharing 328.

Reporting Orchestration System 300 performs the work of translating a given report definition into the inputs provided to a given report content generation engine implementation, managing the implementations, and providing a uniform point of access for fully realized reports. From a given report definition, the Report Orchestration System determines the most appropriate resources from which to obtain the desired report data and the most appropriate report engine with which to process the data before performing the actual report generation.

Resources are specific implementations of data or logic that can be used in the generation of report content. In this context, the resources expose a uniform, generic configuration or description of the data and capabilities they are able to offer. Examples of resources include data sources 310 and report content generation engines 304. A data source includes database connections and object store repositories. The configuration information exposed by a resource not only provides the appropriate access information to the reporting orchestration service, such as a connection URL and authentication credentials, but the configuration information also provides a meaningful, uniform description of the data offered. Reporting Orchestration Service 300 may also inventory the report content generation engine instances in order to capture relevant access information. Additionally, Reporting Orchestration Service 300 may capture the capabilities (e.g., chart generation) of each report content generation engine instance in a meaningful, uniform description.

To decouple the report definition from the underlying report content generation engines and data source implementations, each resource requires an adaptive layer to provide mediation between the actual implementation, the generic report definition, and finally between resource implementations. This knowledge for a given resource implementation is bundled as knowledge module 308 that is loaded based upon the configuration of the report engine at runtime. Each data source implementation understands how to transform its native data set representation to the general form, and vice versa. For instance, in the current example, data source 310 is a relational DB, wherein only relational schema may be accepted and processed. A general form describes the relationship between the actual datasources (e.g. DB table, DB Column), and the data sets in report definitions 316. A relational datasource receives the general form, such as entity and attribute, and translates into a relational DB specific form (e.g. entity maps to DB table, and attribute maps to DB column, and a SQL statement such as SELECT Column X from Table Y) using RelationshipMap that was given to the specific DataSource. If a report requires both SQL database and object store access, the native data set is transformed into the lowest-common form that will be understood and processed iteratively (recursive) by the report content generation engines. Each data source and database connection resource also understands the type of data set it offers in terms of the uniform description described earlier, which is used in determining the best possible match for a given set of requirements expressed in the report definition. Each report content generation engine instance exposes the uniform description of the capabilities it may support. By having the report engine instances expose their capabilities, Reporting Orchestration Service 300 may make the best determination of which data sources and report content generation engines instances to use when generating the content for a report. Encapsulated within knowledge module 308 are aspects which specify whether a given report content generation engine instance supports aggregation operations, content generation, data sources and data sets, and traits.

The coordination of each of the disparate resources to generate a report from the generic report definition is accomplished using the configuration information to determine which resources are best suited to address the requirements described in the definition. Once determined, these resources are coordinated and invoked in accordance with their implementation-specific knowledge encapsulated in knowledge module 308.

Report mapping module 306 is used to provide the mapping relationships between the generic information in the report definitions and the data sources. To implement the dynamic mapping relationships, report mapping module 306 creates relationships that reference the subject objects (e.g., data source, entity, attribute, SQL connection, etc.), and uses knowledge module to obtain the knowledge of how to navigate the relationship to the subject objects. As components of a report definition, such as the dataset entities, attributes, and operators, are described without a physical map of the actual database schema, report mapping module 306 allows the underlying relationships to be dynamically defined and managed at runtime. By including this dynamic mapping functionality, the need to rewrite, rebuild, and redeploy code for the reporting back-end due to a change in the database schema is eliminated.

Each map is defined within a mapping definition XML file 314 that can be used to install/modify the mapping in an instance of the reporting back-end. The XML file is the externalized form of a mapping definition, as it exists outside of the reporting back-end. An example of a mapping definition XML file is shown in FIG. 3C. The XML file is essentially analogous to a report definition XML file, except that it specifies a mapping definition instead of a report definition. There may be a many-to-one relationship between report definitions 316 and the report mapping module 306, such as having multiple report definitions map to single report relationship mapping, as well as having multiple relationship mappings map to one report definition file. The actual mapping relationships required to retrieve data from the data sources is dynamically determined at the time when the actual reports are being generated.

Dataset entities and attributes in the report definition are "primitives" which are the lowest-common denominator expression of dataset mapping in data query systems such as RDBMS and OODBMS. For instance, mapping relationships define the mapping of the primitives to an underlying SQL-based data source. These mapping relationships between primitives may be associative or compositional. An associative relationship represents associations and logical linkages. These associative relationships may be used to call out the relationship of a primitive to an underlying data source construct, or they may be used to define aliases for other primitives that have been already defined. In object-oriented terms, an associative relationship is an "is-a" relationship. A compositional relationship represents the logical relationships between primitives that yield compound primitives or primitives that are made up of other aggregate primitives. In object-oriented terms, a compositional relationship is a "has-a" relationship.

Examples of associative relationships include a SQL table mapping to an entity, an SQL column mapping to attribute, an attribute-to-attribute associative mapping, and an entity-to-entity associative mapping. The most simplistic case of an SQL-based mapping to an entity primitive is a 1:1 mapping of a given SQL table to a single entity. The most simplistic case of SQL-based mapping to the attribute primitive is a 1:1 mapping of a given SQL column from a given SQL table to a single attribute. Each 1:1 column-to-attribute relationship defined should also define an attribute-to-entity mapping. This explicitly defines the relationship of the attribute as an aggregate component of an entity, which is implicitly defined within the SQL schema when the table is defined. Although it is valid, and in some cases desirable, not to define the attribute-to-entity relationship, not doing so may preclude the underlying SQL construction for a query to be malformed if the relationship is needed for a given query operation. An attribute-to-attribute associative mapping represents relationships where an attribute references another attribute. This mapping may conceptually be as simple as denoting a 1:1 mapping to another pre-existing attribute, which effectively defines an alias. This relationship may also be defined with constraints, so that an attribute is mapped by conditional criteria, and not explicitly defined in the relationship definition. Similarly, an entity-to-entity associative mapping represents relationships where an entity references another entity. This mapping may conceptually be as simple as denoting a 1:1 mapping to another pre-existing entity, which effectively defines an alias. This relationship may also be defined with constraints, so that an entity is mapped by conditional criteria, and not explicitly defined in the relationship definition Examples of compositional relationships include an attribute-to-entity compositional mapping and an entity-to-entity compositional mapping. An attribute-to-entity compositional mapping captures relationships that denote ownership of a given attribute by an entity. An entity-to-entity compositional mapping captures relationships that denote join, union, intersect, and other inter-table composition operations that provide a non-schema view of the underlying data.

When a data source has changed, such as when the data source is integrated with other data sources or when the data source is physically moved, report mapping module 306 may dynamically provide validation and notification to the developer. Report mapping module 306 also allows the mapping relationships to be dynamically added, removed, or updated at runtime.

FIG. 4 is an activity diagram of a structured process for generating a report in accordance with the illustrative embodiments. Conceptually speaking, there are three phases that are relevant to the creation of a report: the definition of the report content, the aggregation of the report, and the visualization of the report. The report definition phase specifies the subject being reported on and how to create meaning from the subject. The aggregation report phase implements the process for creating meaning from the raw source data described in the definition phase. The visualization report phase conveys the "meaning" of the report to the user.

To generate a given report, various inputs are first used to define the content of the report in report definition phase 402. Examples of relevant inputs include defining one or more data sources 404, defining constraints (or filters) for the specified data sources 406, defining aggregation/processing of the data desired 408, and defining a desired form of the resulting data set 410. Inputs 412 from a user defining the data sources specify the resources from which sets of data may be extracted. Examples of a data source include an SQL Relational Database or a Multi-Dimensional Database (with cube view enabled). Inputs 412 defining the data source constraints specify the bounds for the data to be selected from a given data source. By associating constraints with the data source, an input data set containing only values relevant to the desired information for the report may be culled for aggregation. Examples of such constraints include a time period constraint (e.g., all data from the data source from time A to time B), and a constraint that narrows the data to only data belonging to certain owner (CI_owner="John Doe"). The input data set may be yielded by culling from the given data sources by the given constraints (e.g. SELECT xxx FROM yyy WHERE zzz (op) zzzz). Inputs 412 for defining aggregation specify how the input sets of data will be transformed to a resulting data output set that illustrates a concise business concept. Inputs 412 for defining visualization specify the desired output form of the report using the resulting data set. This output form may entail the literal content type (e.g., PDF, CSV, HTML, XML, etc.), or more broadly the type of visualization used to represent the resulting data (e.g., charts, tables, or interactive visualization tools).

Once the various inputs required to generate a given report are defined in the report definition phase, aggregation report phase 414 is implemented. The aggregation phase is directly responsible for the transformation of all of the specified input data sources and their associated constraints into the resulting data set. The range and complexity of processing involved against the input data sets may span from none to very involved and may include iterative computation. The process complexity depends upon the intent of the report being defined. Aggregation report phase 414 comprises building input data sets 416 from the data sources 418 determined from the report definition and mapping definition, and aggregating the data 420 to form a resulting data set.

After the aggregation report phase is completed, the resulting data set will be presented to the user in the visualization report phase 422. The visualization phase is the process of composing the resulting data 424 into a form meaningful to the user. The composed resulting data is then passed to the user 426, and the user may view the report 428.

Figure 5:
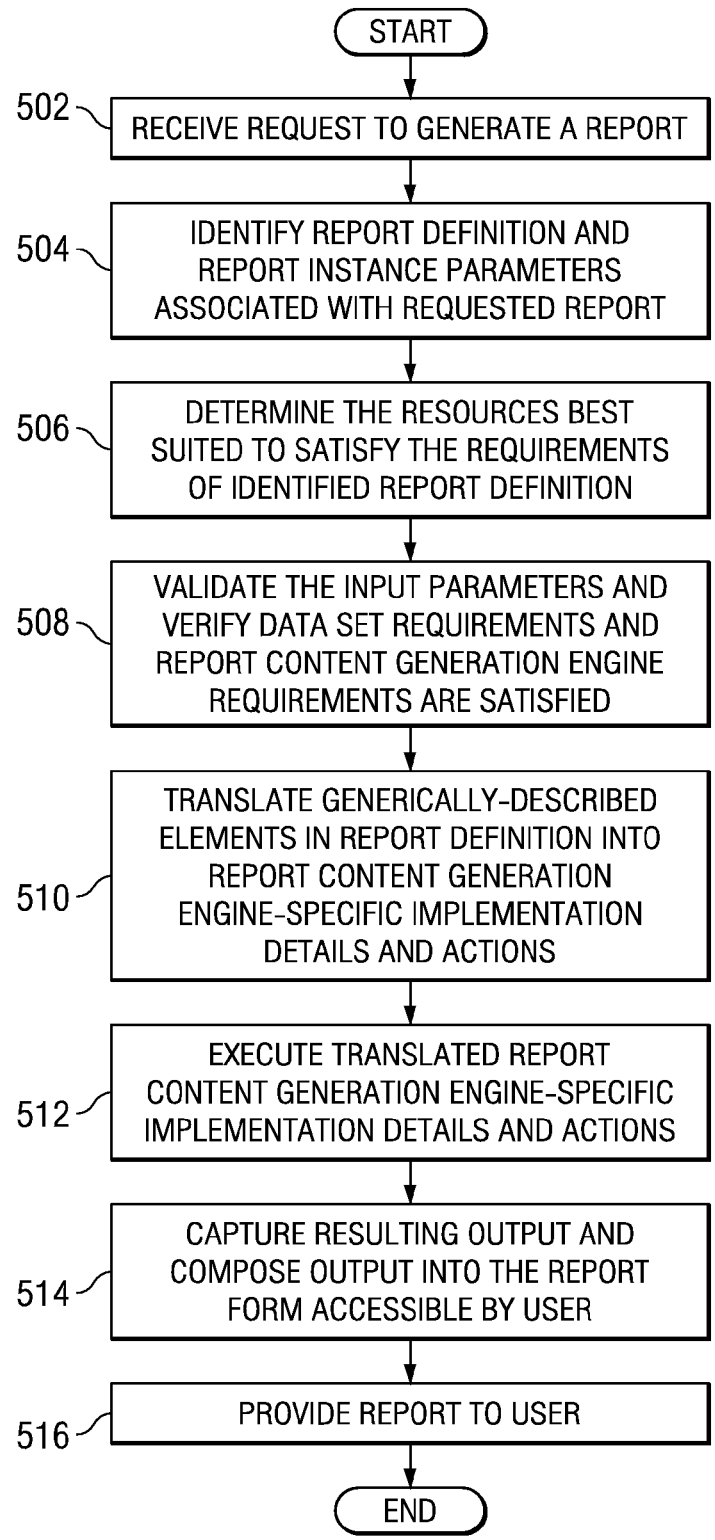
FIG. 5 is an exemplary flowchart for processing an abstracted report definition in accordance with the illustrative embodiments.

FIG. 5 is an exemplary flowchart for processing an abstracted report definition in accordance with the illustrative embodiments. The process described in FIG. 5 may be implemented using a reporting service, such as Reporting Orchestration System 300 in FIG. 3A. The process begins with the Reporting Orchestration System receiving a request to generate a report (step 502). The request may be initiated by a user, such as report user 322 in FIG. 3A, or the request may be initiated automatically via a report scheduling function. Upon receiving the request, the Reporting Orchestration System identifies the report definition and the report instance parameters associated with the requested report (step 504). The Reporting Orchestration System then determines the resources which are best suited to satisfy the requirements of the identified report definition (step 506). The Reporting Orchestration System may make this determination using the uniform descriptions provided by each resource which define the data and capabilities that the resource is able to provide. For instance, the Reporting Orchestration System determines the data source that will best provide the desired data for the requested report. The data source determination is dependent upon the following elements in the report definition: the required input data source/data sets; and, if multiple data sources are specified, the existing mapping to common normalized form. Mapping contains abstract descriptions, such as entity-to-entity relationships (compositional), which encapsulate what entities may be composed together with the relationship being represented and the pivot point (or points) about which the entities are related, or an attribute-to-attribute relationship (associative) which encapsulates the attributes that are related, as well as the associative nature that defines the relationship. However, the actual data source cannot accept these abstract descriptions, and thus, the descriptions must be translated into common normalized statements, such as Recursive SELECT or Concatenated Tables.

In addition, the Reporting Orchestration System determines the report content generation engine instance that will best satisfy the requirements of the report. The report content generation engine determination is dependent upon the following elements in the report definition: support for the required data sources/data sets; support for the required aggregation operations; capability to produce the desired report content; and the capability to support other report traits, which may determine the best possible report content generation engine instance if multiple candidates satisfy the minimum requirements.

Once the resources are determined and acquired, the Reporting Orchestration System performs a validation of the input parameters and verifies that the data set requirements and the report content generation engine requirements are satisfied (step 508). The Reporting Orchestration System then performs a translation of the generically-described elements in the report definition into the report content generation engine-specific implementation details and actions (step 510). This translation may include dynamically translating the input parameters, data sources, and traits from the report definition to the report content generation engine-native semantics by determining the mapping relationships between the generic information in the report definition and the data sources identified in step 506. The translation may also include translating each aggregation operation into its corresponding report content generation engine-native action. Furthermore, if multiple, disparate data source types are identified in step 506, the translation may include translating multiple data sources and their corresponding data sets into a normalized form supported by the report content generation engine.

The Reporting Orchestration System then executes upon the list of translated report content generation engine-specific implementation details and actions (step 512). The resulting output is then captured and composed into the report form accessible by the user (step 514). The report is then provided to the user (step 516), with the process terminating thereafter. Any report content generation engine-specific encoding of the resulting report content may be transformed into a uniform format and stored for later user retrieval.

Figure 6:
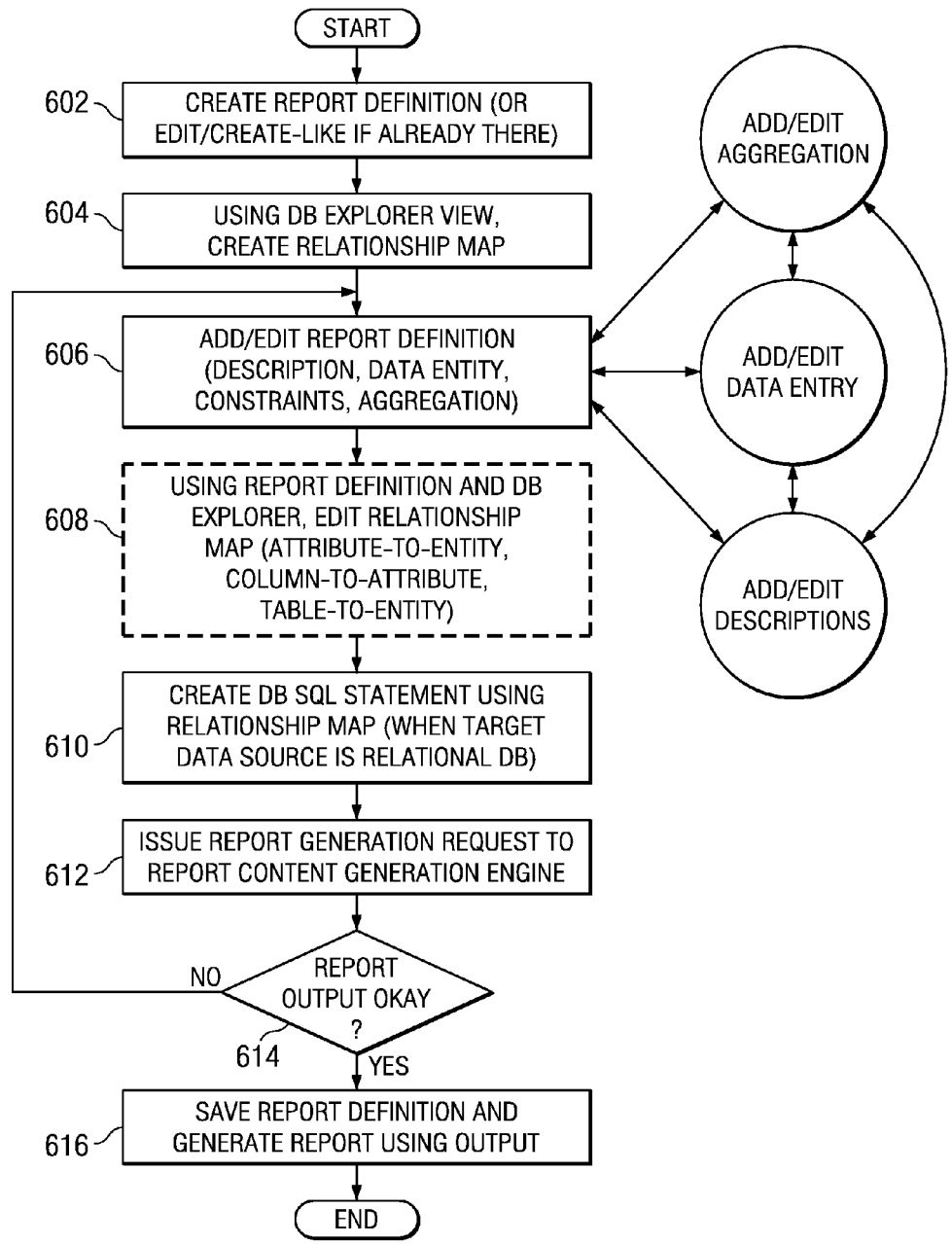
FIG. 6 is an exemplary flowchart for implementing report mapping dynamically in accordance with the illustrative embodiments.

FIG. 6 is an exemplary flowchart for dynamically creating report mapping relationships at runtime in accordance with the illustrative embodiments. This flowchart further describes the process of translating the generically-described elements in a report definition into the report content generation engine-specific implementation details and actions in step 510 in FIG. 5. The process described in FIG. 6 may be implemented in a report content generation engine, such as report mapping module 304 in FIG. 3A.

The process begins with the report content generation engine creating a report definition or editing an existing report definition (step 602). The mapping module in the report content generation engine then creates a relationship mapping definition (step 604). It should be noted that if an existing report definition is edited in step 602, the process may skip to step 608. If a report definition is created in step 602, the internals or data set details of the report definition, such as report description, data entity, constraints, aggregation information, may then be added to the report definition (step 606).

Next, the mapping module edits the relationship mapping definition (step 608) according to the created or edited report definition, such as by editing the attribute-to-entity, column-to-attribute, and table-to-entity relationships. The report content generation engine then creates a DB SQL statement using the mapping relationship definition (step 610). The target data source is a relational database. A report generation request is then issued to the report content generation engine (step 612), such as ABX report generator 324 in FIG. 4. A determination is then made by the report generation engine as to whether the user has indicated that the report output is acceptable (step 614). For example, a report output may not be deemed acceptable if the output is not mapped correctly, the database has been changed, the appearance (boundary) of the report is incorrect, or the user simply does not like the look of the report. If the report is unacceptable, the process loops back to step 606. If the report is acceptable, the report definition is saved, and the report generation is completed (step 616), with the process terminating thereafter.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method executed by a processor for processing abstracted report definitions within an information technology infrastructure, the computer implemented method comprising:
   responsive to receiving a request to generate a report, identifying a report definition associated with the requested report, wherein the report definition comprises a generalized description of desired data in the report without any database-specific properties;
   identifying resources which are able to provide the desired data using report instance parameters in the report definition;
   responsive to determining the resources that are able to provide the desired data, translating the generalized description in the report definition into report content generation engine-specific implementation details and actions by mapping relationships between the generalized description of desired data in the report definition and the identified resources;
   executing the translated report content generation engine-specific implementation details and actions to obtain the desired data from the resources; and
   generating the report using the obtained data.

2. The computer implemented method of claim 1, wherein the request to generate a report is initiated from one of a user or a report scheduling function.

3. The computer implemented method of claim 1, wherein the identified resources include physical data sources and a report content generation engine.

4. The computer implemented method of claim 3, wherein the report definition comprises input data set requirements and report content generation engine requirements.

5. The computer implemented method of claim 4, wherein the identifying step further comprises:
   verifying that the physical data sources satisfy the data set requirements in the report definition.

6. The computer implemented method of claim 4, wherein the identifying step further comprises:
   verifying that the report content generation engine satisfies the report content generation engine requirements in the report definition.

7. The computer implemented method of claim 6, wherein the verification step further comprises:
   selecting a best possible report content generation engine instance if multiple candidates satisfy minimum report content generation engine requirements in the report definition.

8. The computer implemented method of claim 1, wherein the generalized description of desired data includes descriptive information about aggregation operations and other elements that describe a business concept.

9. A data processing system for processing abstracted report definitions within an information technology infrastructure, the data processing system comprising:
   a bus;
   a storage device connected to the bus, wherein the storage device contains computer usable code;
   at least one managed device connected to the bus;
   a communications unit connected to the bus; and
   a processing unit connected to the bus, wherein the processing unit executes the computer usable code to identify a report definition associated with the requested report in response to receiving a request to generate a report, wherein the report definition comprises a generalized description of desired data in the report without any database-specific properties, identify resources which are able to provide the desired data using report instance parameters in the report definition, translate the generalized description in the report definition into report content generation engine-specific implementation details and actions by mapping relationships between the generalized description of desired data in the report definition and the identified resources in response to determining the resources that are able to provide the desired data, execute the translated report content generation engine-specific implementation details and actions to obtain the desired data from the resources, and generate the report using the obtained data.

10. The data processing system of claim 9, wherein the identified resources include physical data sources and a report content generation engine.

11. The data processing system of claim 10, wherein the report definition comprises input data set requirements and report content generation engine requirements.

12. The data processing system of claim 11, wherein the identifying step further comprises:
verifying that the physical data sources satisfy the data set requirements in the report definition.

13. The data processing system of claim 11, wherein the identifying step further comprises:
verifying that the report content generation engine satisfies the report content generation engine requirements in the report definition.

14. A computer program product for processing abstracted report definitions within an information technology infrastructure, the computer program product comprising:
a non-transitory computer readable storage medium having computer usable program code stored thereon, the computer usable program code comprising:
computer usable program code for identifying a report definition associated with the requested report in response to receiving a request to generate a report, wherein the report definition comprises a generalized description of desired data in the report without any database-specific properties;
computer usable program code for identifying resources which are able to provide the desired data using report instance parameters in the report definition;
computer usable program code for translating the generalized description in the report definition into report content generation engine-specific implementation details and actions by mapping relationships between the generalized description of desired data in the report definition and the identified resources in response to determining the resources that are able to provide the desired data;
computer usable program code for executing the translated report content generation engine-specific implementation details and actions to obtain the desired data from the resources; and
computer usable program code for generating the report using the obtained data.

15. The computer program product of claim 14, wherein the identified resources include physical data sources and a report content generation engine.

16. The computer program product of claim 15, wherein the report definition comprises input data set requirements and report content generation engine requirements.

17. The computer program product of claim 16, wherein the computer usable program code for identifying resources further comprises:
computer usable program code for verifying that the physical data sources satisfy the data set requirements in the report definition.

18. The computer program product of claim 16, wherein the computer usable program code for identifying resources further comprises:
computer usable program code for verifying that the report content generation engine satisfies the report content generation engine requirements in the report definition.

19. The computer program product of claim 18, wherein the computer usable program code for verifying that the report content generation engine satisfies the report content generation engine requirements further comprises:
computer usable program code for selecting a best possible report content generation engine instance if multiple candidates satisfy minimum report content generation engine requirements in the report definition.

20. The computer program product of claim 14, wherein the generalized description of desired data includes descriptive information about aggregation operations and other elements that describe a business concept.

* * * * *